United States Patent [19]
Ito et al.

[11] Patent Number: 5,923,740
[45] Date of Patent: Jul. 13, 1999

[54] RELIEF METHOD OF BILLING DATA IN ATM SWITCHING SYSTEM

[75] Inventors: Kazuya Ito; Jun Ito; Noriko Hayashi, all of Yokohama; Kohei Ueki, Kawasaki, all of Japan

[73] Assignee: Fujitsu Limited, Kawasaki, Japan

[21] Appl. No.: 08/924,703

[22] Filed: Sep. 5, 1997

Related U.S. Application Data

[30] Foreign Application Priority Data

Mar. 21, 1997 [JP] Japan .................................. 9-068698

[51] Int. Cl.⁶ .......................... H04L 12/28; H04M 15/00
[52] U.S. Cl. .......................... 379/112; 379/114; 370/395
[58] Field of Search .................................... 370/395, 394, 370/392, 398, 217, 216; 379/112, 113, 114, 1, 2, 9, 27, 26

[56] References Cited

U.S. PATENT DOCUMENTS

| | | | |
|---|---|---|---|
| 5,394,408 | 2/1995 | Nishimara et al. | 371/57.2 |
| 5,398,236 | 3/1995 | Hemmady et al. | 370/395 |
| 5,406,548 | 4/1995 | Itoh et al. | 370/395 |
| 5,481,534 | 1/1996 | Beachy et al. | 370/395 |
| 5,504,744 | 4/1996 | Adams et al. | 370/395 |
| 5,513,191 | 4/1996 | Takechi et al. | 370/395 |
| 5,757,775 | 5/1998 | Yokoyama et al. | 370/395 |
| 5,872,770 | 2/1999 | Park et al. | 370/249 |

FOREIGN PATENT DOCUMENTS

| | | |
|---|---|---|
| 3-268651 | 11/1991 | Japan . |
| 4-100435 | 4/1992 | Japan . |
| 4-127763 | 4/1992 | Japan . |
| 7-244613 | 9/1995 | Japan . |

*Primary Examiner*—Curtis A. Kuntz
*Assistant Examiner*—Rexford N Barnie
*Attorney, Agent, or Firm*—Staas & Halsey

[57] ABSTRACT

A billing data is relieved by a relief method of billing data when a failure occurs on SVC (Switched Virtual Connection) calls which subscribers connect and disconnect. The relief method of billing data on an asynchronous transfer mode switching system includes an asynchronous transfer mode switch, a terminator provided on an input side of said asynchronous transfer mode switch for counting the number of cells sent from subscribers or other switching system, and a call controller for controlling paths on said asynchronous transfer mode switch, collecting a count value of the numbers of cells on said terminator, and creating billing data according to the count value of the collected cell number and call control data, wherein only the count value of the number of the cells counted on said terminator is removed from the values to be initialized on initialization caused by a failure.

7 Claims, 8 Drawing Sheets

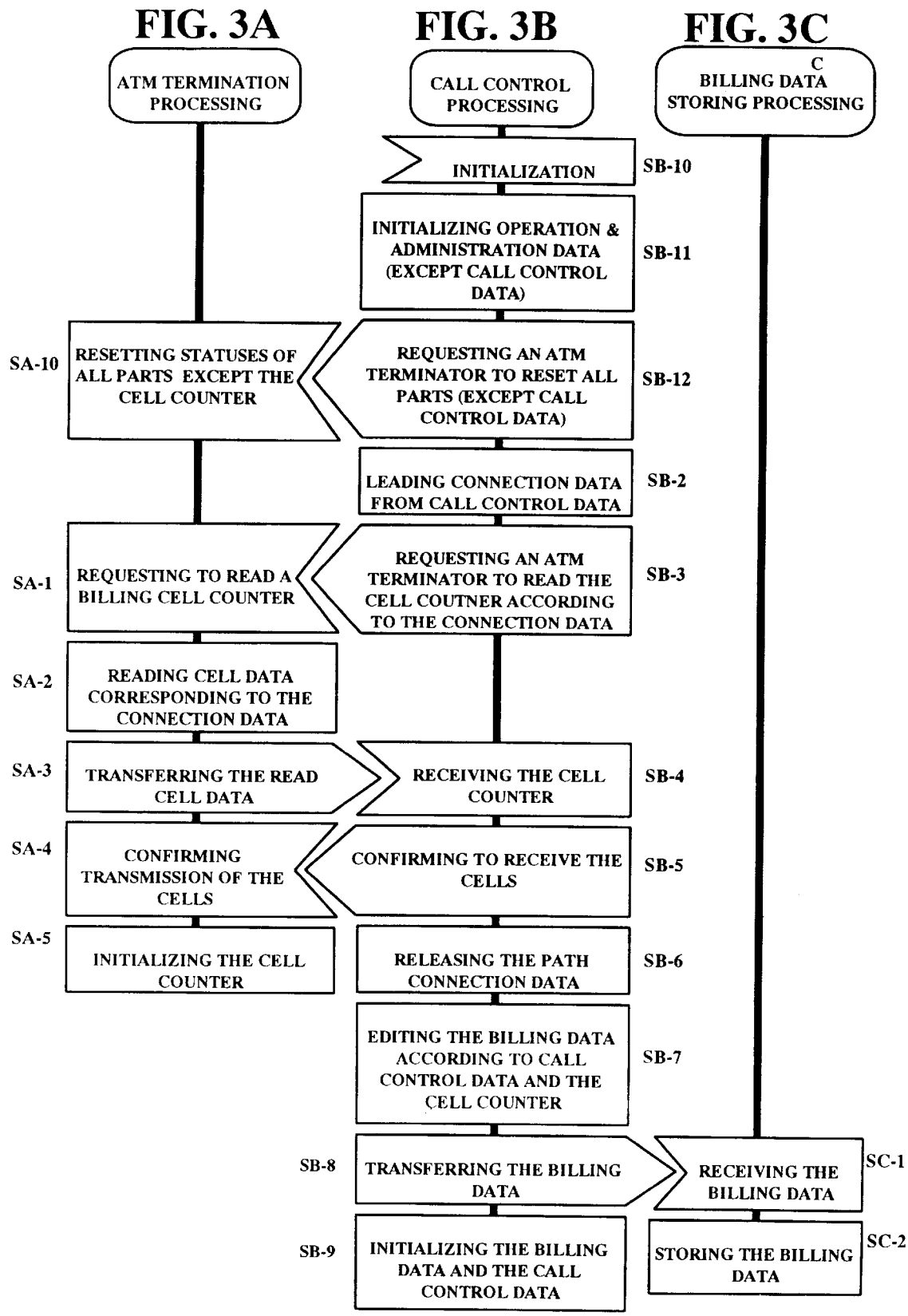

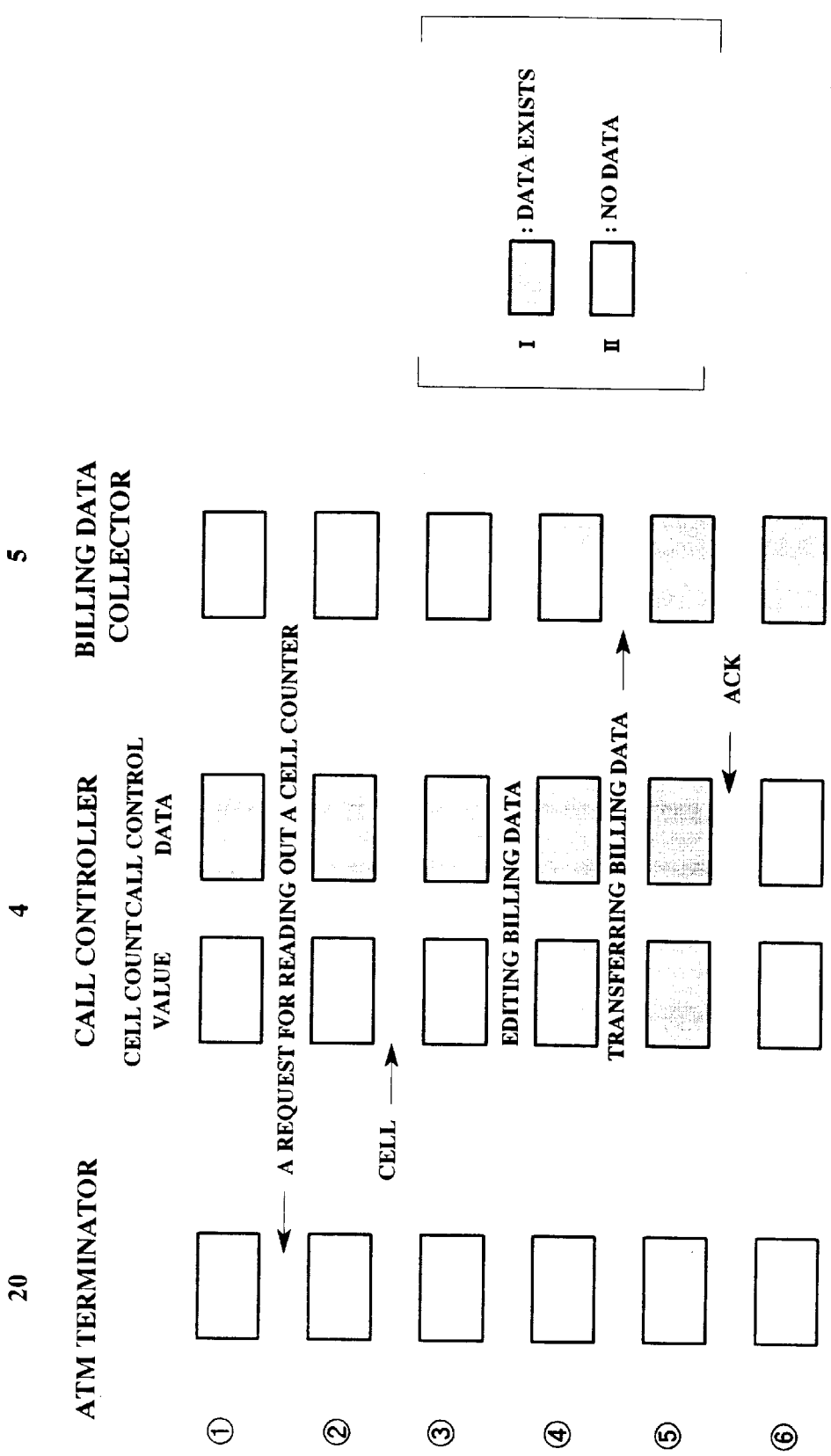

RELIEF METHOD OF BILLING DATA IN ATM SWITCHING SYSTEM

BACKGROUND OF THE INVENTION

1. Field of the Invention

The present invention relates to a billing system on asynchronous transmission mode (ATM) switching system. More particularly, it relates to a relief method of billing data in ATM switching system when a failure occurs on switched virtual connection calls that subscribers connect or disconnect, or the system is resumed.

2. Description of the Prior Art

In a conventional system, a call data saving function has been used to relieve billing data by periodically evacuating the billing data. In the system, the fee is charged according to a calling time, and the method is different from a method in the ATM switching system.

On the other hand, a call is charged according to the number of normal cells transmitted through a connection in an ATM switching system (for example, refer to Japanese Unexamined Patent Publication No. HEI 4-12763). Then, ATM terminator counts the number of the cells in order to perform the processing at high speed. Therefore, the billing data is formed by a cell counter value read out by the ATM terminator and call control data in a call controller, which is independent of the ATM terminator.

When the billing data is relieved on initializing the device when a failure occurs (hereinafter, it is referred as to initialization), it is required to relieve bill forming data. However, the ATM switch collects the billing data formed according to the number of the cells and therefore, the reliability of the data is lacked even if the data is periodically evacuated.

This is because large amount of cells can be instantaneously transferred and even no cell can be transferred in an ATM switching service with a large capacity. If a problem of evacuating the data can be resolved, there is possibility of having much time to facilitate communications in order to collect data between the ATM terminator and the call controller, each of which is independent, and there is also the possibility of communication congestion because the amount of the access to the device becomes huge.

Because the above-described problem is recognized, only a relief method of billing data has not been provided in the existing ATM switching system.

SUMMARY OF THE INVENTION

Accordingly, it is an object of the present invention to provide a relief method of billing data in order to relieve the billing data on initialization in an ATM switching system.

It is another object of the present invention to provide a relief system of billing data in order to relieve the billing data on initialization in an ATM switching system that is formed of an exclusive device for collecting the billing data, i.e., the number of the cells, and a call controller in a network for charging according to the number of the cells.

It is a further object of the present invention to provide a relief method of billing data of SVC calls on initialization in an ATM switching system including ATM terminators for collecting the number of the charged cells in a real time. More particularly, it relates to a relief method of billing data for providing a service by divided or independent relief function.

It is a furthermore object of the present invention to provide a relief method of billing data in which the billing data to the appropriate call can be relieved even if the SVC calls can not be relieved on initialization.

BRIEF DESCRIPTION OF THE DRAWINGS

FIGS. 3A to 3C are operational flowing charts of one embodiment according to the present invention.

FIG. 7 shows a case where a call on initialization is on the statuses ③ to ⑥ after creating the billing data and before initializing the cell count value on the structure shown in FIG. 6.

DESCRIPTION OF THE PREFERRED EMBODIMENTS

Figure 1:
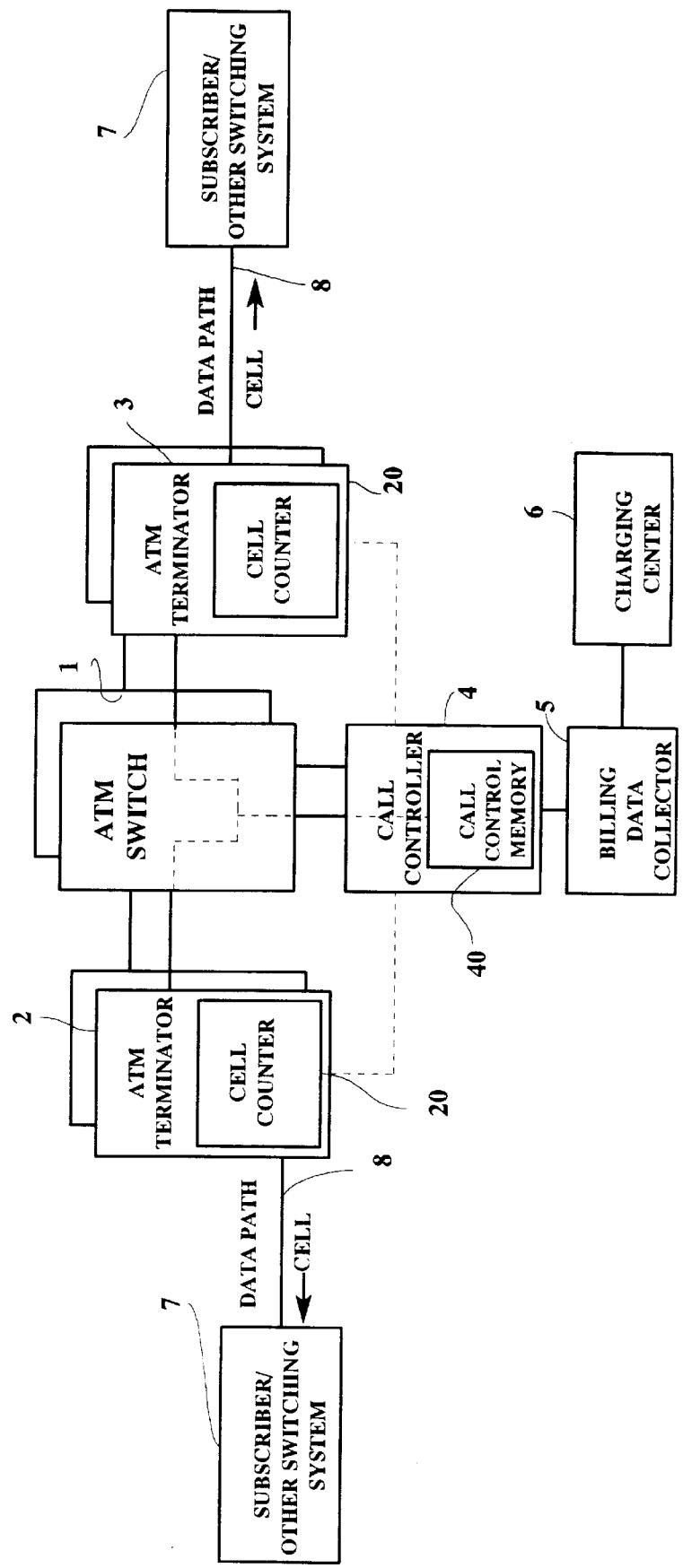
FIG. 1 shows a basic structure of an ATM switch employing a relief method of billing data according to the present invention. More particularly, it shows a basic outline for collecting the billing data.

Now, embodiments according to the present invention will be explained in accompanying with the attached drawings. Throughout the following description, the same reference numerals or marks are used to denote and identify corresponding or identical components.

FIG. 1 shows a basic structure of an ATM switching system employing a relief method of billing data according to the present invention. More particularly, it shows a basic concept for collecting the billing data.

In FIG. 1, the ATM switching system includes an ATM switch 1, ATM terminators 2 and 3, a call controller 4 and a billing data collector 5. The ATM switch 1, the ATM terminators 2 and 3, and a call controller 4 are duplicated.

The billing data collector 5 is connected to a charging center 6. The ATM terminators 2 and 3 are further connected to subscriber terminals or other switching system 7 through a data path 8. In the structure shown in FIG. 1, the ATM terminators 2 and 3 charges, i.e., counts the number of the passed cells for charging, and the ATM terminators 2 and 3 are independent from a call controller 4 which controls the ATM switch 1, so that the switching speed in the ATM switch 1 becomes first. A cell counter 20 for counting the number of the passed cells is provided on each of the ATM terminators 2 and 3.

On call termination, the billing data collector 5 edits the billing data according to a cell count value in the ATM cell counter 20 and call control data stored in a call control memory 40 in the call controller 4, i.e., dates of call establishment and call termination and calling or called telephone numbers. The edited billing data is sent to the charging center 6.

Figure 2A:
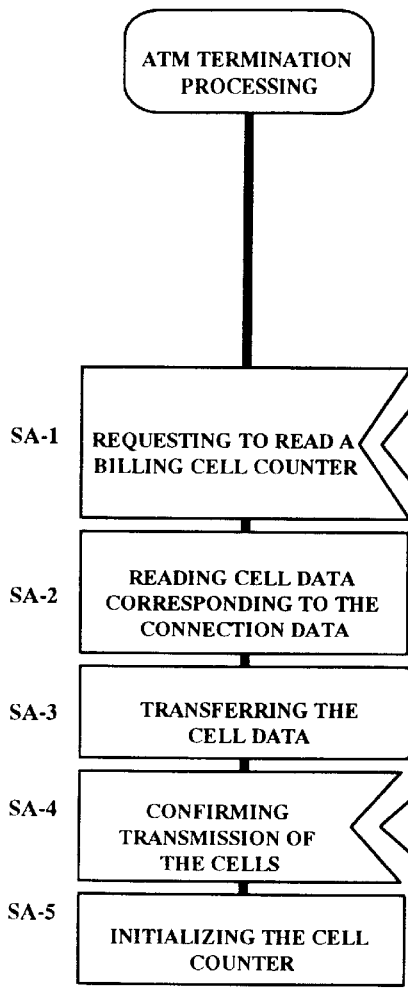
FIGS. 2A to 2C are operational flowing charts for explaining operations for collecting billing data on the structure shown in FIG. 1.
Figure 2B:
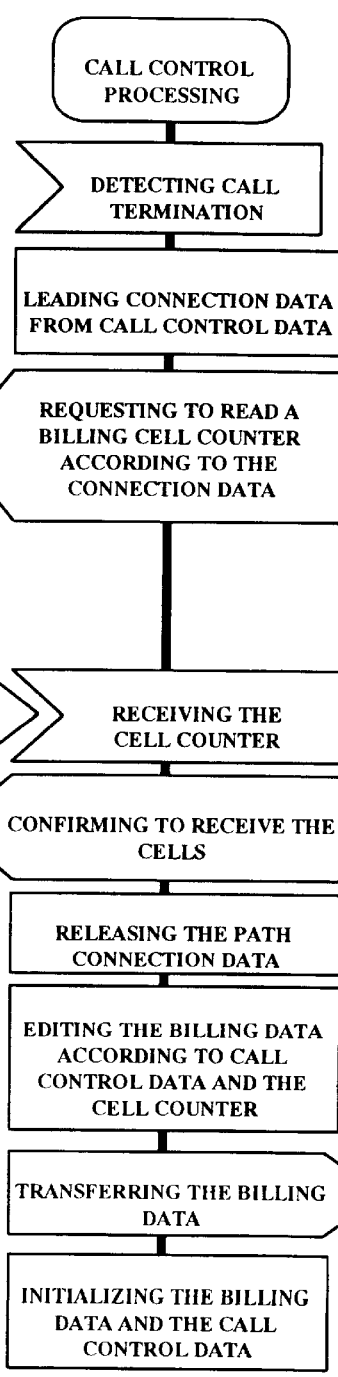
Figure 2C:
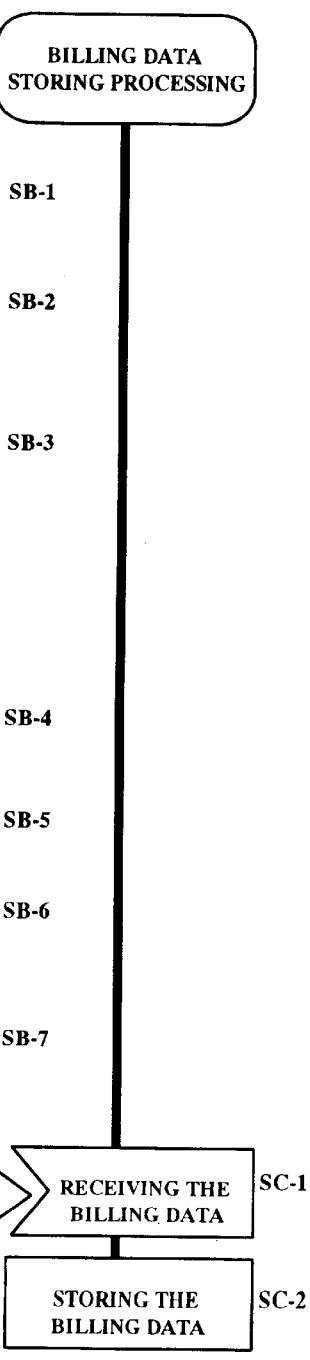

In regard to FIGS. 2A to 2C, operational flowing charts of operations for collecting the billing data will be now explained. FIG. 2A shows an ATM termination processing executed by the ATM terminator 2, FIG. 2B shows a call control processing executed on the call controller 4, and FIG. 2C shows a storing processing of the billing data.

When the call controller 4 detects the call termination (STEP SB-1), the controller 4 leads connection data from the call control data (STEP SB-2).

The call controller 4 requests to read the value counted in the charged cell counter 20 to the ATM terminator 2 according to the led connection data (STEP SB-3). The ATM terminator 2 receives a request for reading the count value of the charged cells (STEP SA-1), and reads out the cell data corresponding to the connection data in the cell counter 20 (STEP SA-2).

The ATM terminator 2 transfers the read cell data, i.e., the cell count value, to the call controller 4 (STEP SA-3). The call controller 4 receives the cell count value (STEP SB-4). The call controller 4 sends a notification for confirmation of receiving the cell count value (STEP SB-4), and the ATM terminator 2 receives them to confirm transmission of the cell count value (STEP SA-4).

Accordingly, the ATM terminator 2 resets and initializes the count value in the charged cell counter 20 by the transmission of the cell count value (STEP SA-5).

On the other hand, the call controller 4 releases path connection data due to the call termination (STEP SB-6). Then, the controller 4 edits the billing data according to the call control data in the subscriber table and the cell count value (STEP SB-7), and transfers the edited billing data to the billing data collector 5 (STEP SB-8). Therefore, the call controller 4 initializes the billing data and the call control data in the call control memory 40 (STEP SB-9).

The billing data transferred from the call controller 4 is stored in the data collector 5 (STEP SC-2), and is sent to the charging center 6 at predetermined intervals.

By the above-described procedure, the call controller 4 collects the cell count value from the ATM terminator 2 every time of the call termination on a normal status. Thereby, it becomes possible to edit the billing data.

By the way, the initialization is executed when failures occur, and the call controller 4 resets the ATM terminator. The cell counter, i.e., a counter function included in the ATM terminator 2, is normally initialized by this reset operation. Therefore, the counted value of the cells is unconditionally aborted on initialization. Thereby, it becomes impossible to edit the billing data. It is a key of the present invention to overcome the above-described shortage.

FIGS. 3A to 3C are operational flowing charts of one embodiment according to the present invention. Those are corresponding to the operational flowing charts for collecting the billing data shown in FIGS. 2A to 2C. They show an operation for collecting the billing data by removing only the cell counter 20 from the parts to be reset on the reset operation in the ATM terminator 2 on initialization. FIG. 3A shows an ATM termination processing executed by the ATM terminator 2, FIG. 3B shows a call control processing executed by the call controller 4, and FIG. 3C shows a billing data storing processing, which are the same as those shown in FIGS. 2A to 2C. An operation in the call controller 4 is executed according to a processing program stored in the memory area 401 shown in FIG. 4, and the controller 4 detects the initialization at first (STEP SB-10).

When the initialization is detected, the controller 4 initializes operation and administration data stored in the data memory 402 of the call control memory 40 except the call control data (STEP SB-11). Then, the controller 4 requests the ATM terminator 2 to reset all the parts except the cell counter 20 (STEP SB-12). In reply to this request, the ATM terminator 2 resets statuses of all the parts except the cell counter 20 (STEP SA-10).

The call controller 4 leads connection data from the call control data (STEP SB-2). The controller 4 request the ATM terminator 2 to read the count value of the billing cell counter 20 according to the led connection data (STEP SB-3). The ATM terminator 2 receives the request for reading the billing cell count value (STEP SA-1), and reads the cell data corresponding to the connection data in the cell counter 20 (STEP SA-2).

The ATM terminator 2 transfers the read cell data, i.e., the cell count value, to the call controller 4 (STEP SA-3). The call controller 4 receives the cell count value (STEP SB-4). Then, the call controller 4 sends a notification for confirming to receive the cell count value from the call controller 4 (STEP SB-4), and the ATM terminator 2 receives the cell count value to confirm the transmission of the cell count value (STEP SA-4).

Then, the ATM terminator 2 resets and initializes the count value of the billing cell counter 20 according to the confirmation of transmitting the cell count value (STEP SA-5).

On the other hand, the call controller 4 releases the connection data due to the call termination (STEP SB-6). Then, the controller 4 edits the billing data according to the call control data in the subscriber table and the cell count value (STEP SB-7), and sends the edited billing data to the billing data collector 5 (STEP SB-6). At last, the call controller 4 initializes the billing data and the call control data in the call control memory 40 (STEP SB-9).

The billing data transferred from the call controller 4 is stored in the data collector 5 (STEP SC-2), and is transferred to the charging center 6 at regular intervals.

The cell count value for editing the billing data in the reset operation on initialization is removed from the values to be reset on the step SB-12, as mentioned above. This means that the cell counter value is saved in the ATM terminator 2, which is switched to a standby group. Thereby, it becomes possible to create the billing data with the same procedure as that on the call termination.

That is, the billing data is not created by the data evacuated by the call data save function on the initialization. It is possible to obtain the billing data that has high reliability on resuming and create the billing data by freezing the data included in the ATM terminator 2 and the call controller 4 in a real time.

Figure 4:
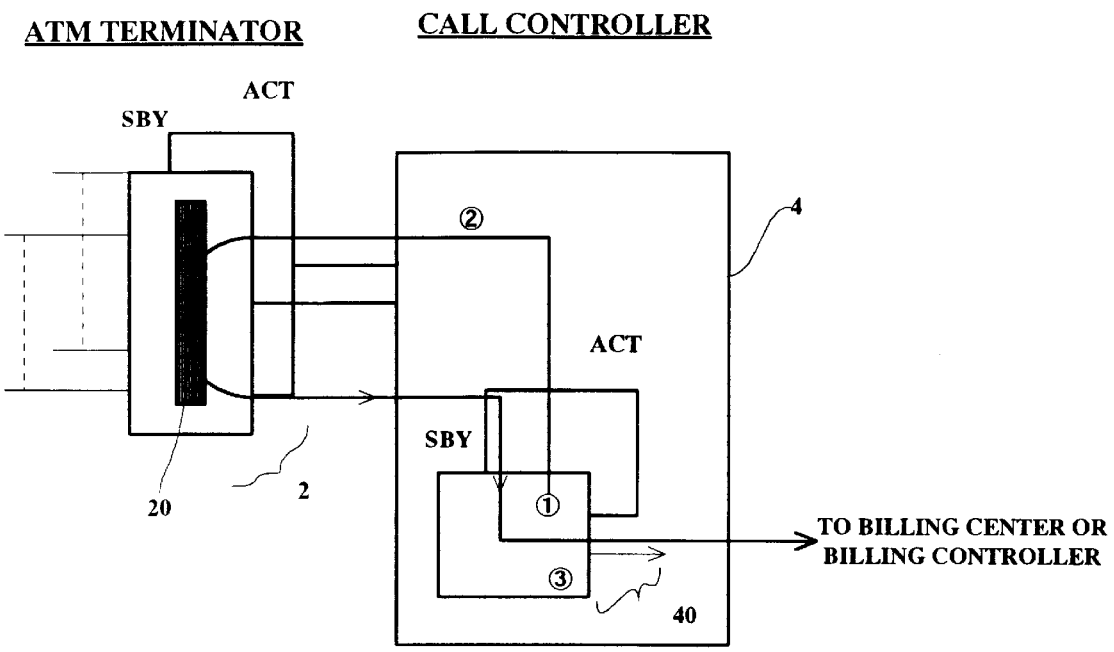
FIG. 4 is an explanatory diagram of an ATM terminator and a call controller 4 extracted from the structure shown in FIG. 1 as another embodiment according to the present invention.

FIG. 4 shows other embodiment of the present invention. In FIG. 4, the ATM terminator 2 and the call controller 4 are shown as extracted from the structure shown in FIG. 1. The ATM terminator 2 and the call control memory 40 in the call controller 4 are duplicated as active (ACT) and standby (SBY) groups. FIG. 4 shows a status that the active ATM terminator 2 is switched to a standby group because of a fiber failure.

In the embodiment shown in FIG. 4, it is possible to use the data frozen as temporary call data for collecting and charging the data frozen on the standby group side by switching the duplicated device from the active group to the standby group. In the active group, a normal service can be resumed, and the standby group executes the relief processing of the billing data on the initialization. Thereby, it becomes possible to relieve the billing data without losing the service.

Figure 5:
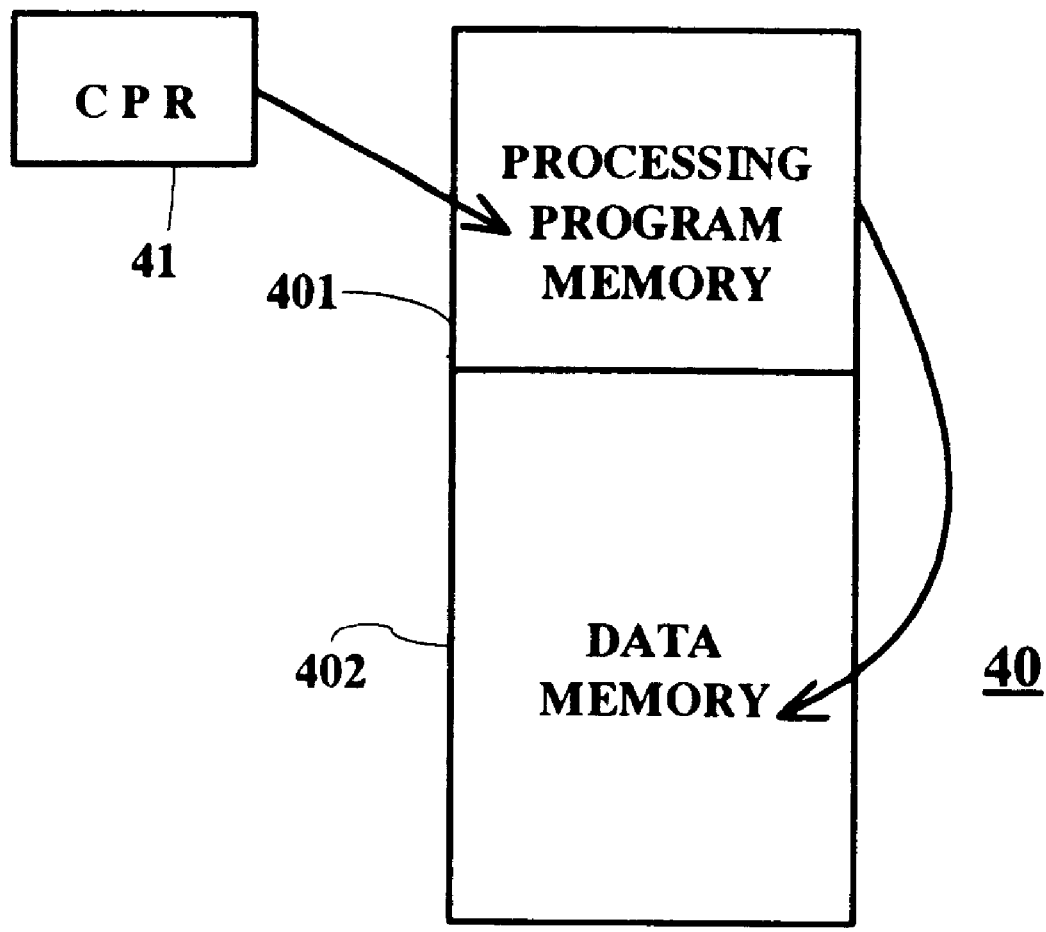
FIG. 5 is a block diagram illustrating the structure of the call controller 4.

FIG. 5 shows a structure of the call controller 4 including a call control processor 41 and a call control memory 40. The memory 40 further includes a processing program memory area 401 and a data memory area 402. The call control processor 41 executes the processing program stored in the processing program memory area 401 in order to freeze the cell count value on the initialization, and read the frozen cell count value sent from the standby group as well as to execute call control processing on a normal state.

The data memory area 402 stores the call control data corresponding to each subscriber, and also stores the cell count value read out and transferred from the ATM terminator 2. The operational flowing chart will be explained here. The active ATM terminator 2 in which the cell count value is frozen is switched to the standby group, and the call control memory 40 in which the call control data in the call controller 4 is frozen is switched to the standby group.

After switching the groups in this way, the call controller 4 retrieves a call employed on the initialization from the call control data stored in the call control memory 40 at first and extracts the control data (STEP ①).

The cell count value corresponding to the cell counter 20 in the ATM terminator 2 is read according to the call control data extracted on the step ① (STEP ②). Further, the cell count value read on the step ② is combined to the call control data to form the billing data (STEP ③).

Further, the billing data formed on the step ③ is transferred to the charging center 6 through the billing data collector 5 (STEP ④). After collecting the billing data from the SBY groups in this way, the cell count value frozen in the SBY group and the call control data can be initialized.

In this way, it is possible to execute a normal service employing the ACT group on the call processing after resuming, because the standby group is employed on the relief processing of the billing data executed in the duplicated system according to the present invention.

As described above, there is a case where a call on initialization is double charged according to a status of the appropriate call after creating the billing data and before the cell count value is initialized in a system for initializing the ATM terminator after creating the billing data on the call termination.

Figure 6:
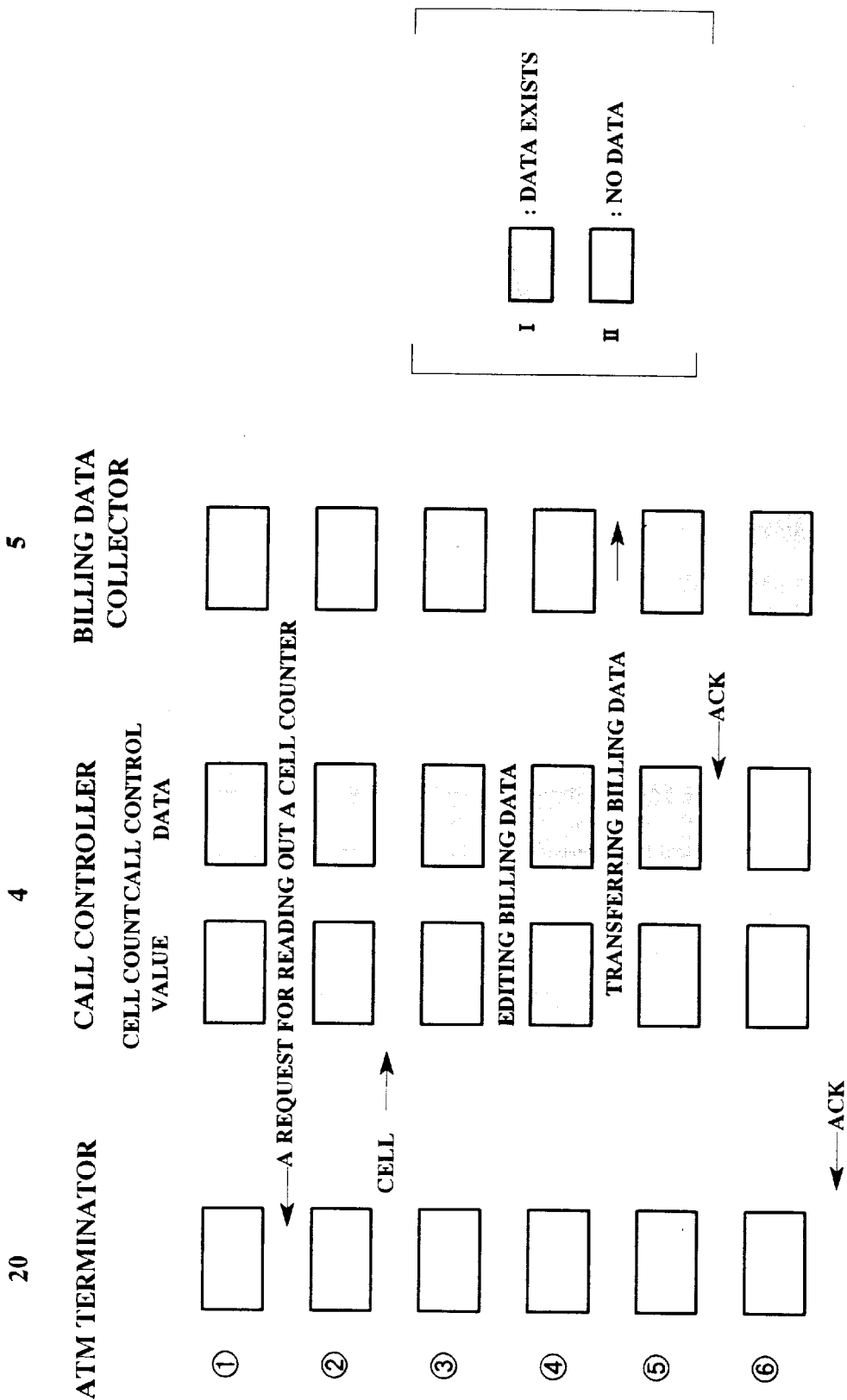
FIG. 6 is an explanatory diagram of double-charging a call according to a status of the appropriate call after creating the billing data on initialization and before initializing the cell count value.

FIG. 6 is an explanatory diagram for showing the status. In FIG. 6, ① to ⑥ respectively show statuses when generating each call. Further, I means that the data exists in the corresponding device, and II means an idle status. Therefore, for example, in FIG. 6, the status ① shows the cause where only the cell count value in the cell counter 20 of the ATM terminator 2 and the call control data in the call control memory 40 of the call controller 4 exist.

In FIG. 6, the billing data has been already created and transferred to the billing data collector 5 on statuses ④ to ⑥. When initialization is executed in this point, the cell count value is frozen, and the billing data is created again. This means double charging. However, on the status ⑥, even if the billing data is constructed, the billing is not charged double because there is no more call control data so that there is no link to the call control data.

Then, the call control data is masked until becoming to the status ⑥ in order to prevent the charge from being double on the statuses ④ to ⑥. Thereby, it becomes possible to prevent the charge from being double similar to the status ⑥ because there is no call control data. A program stored in the processing program memory area 401 shown in FIG. 5 can execute the mask control.

FIG. 7 shows a case before creating billing data for cells on the initialization and after initializing the cell count value in FIG. 6. The ATM terminator 2 has been already initialized, and there is no data. In this case, the read out cell count value is treated as call control data. Even if there is no cell count value in the cell counter 20 of the ATM terminator 2, the cell count value is secured on the initialization.

Figure 8A:
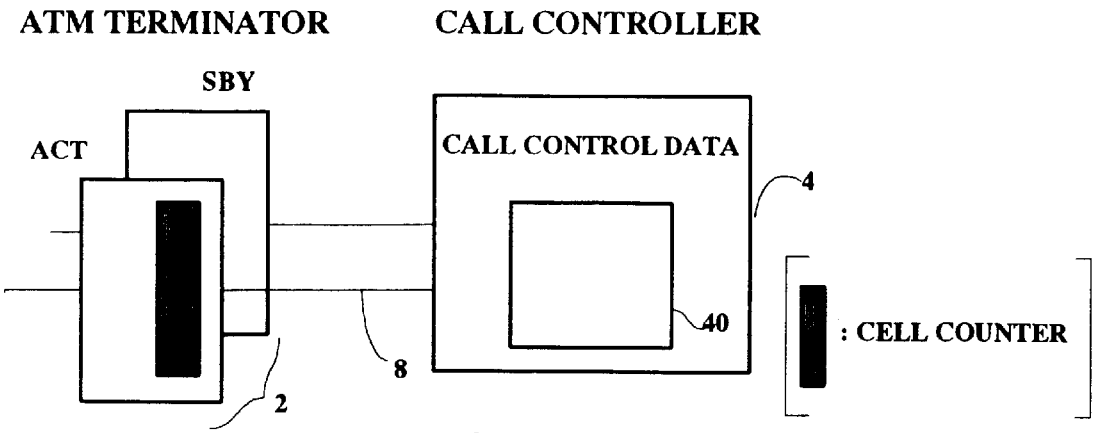
FIGS. 8A through 8C are diagrams explaining a case where the cell count value becomes difficult to read when communication failures occur between the ATM terminator 2 and the call controller 4.
Figure 8B:
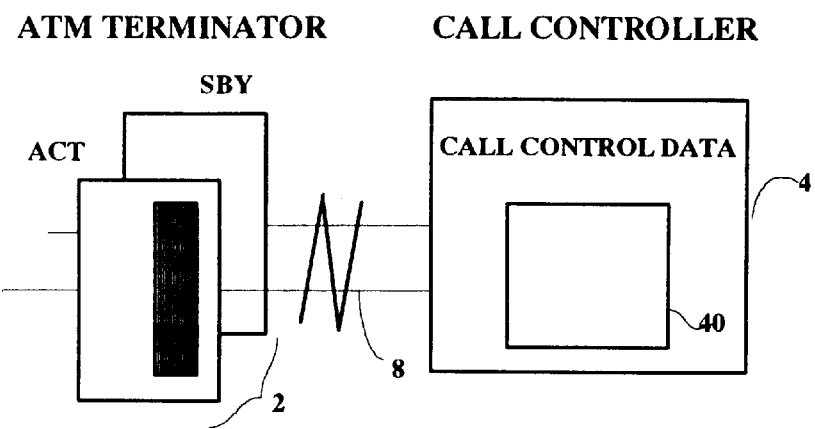
Figure 8C:
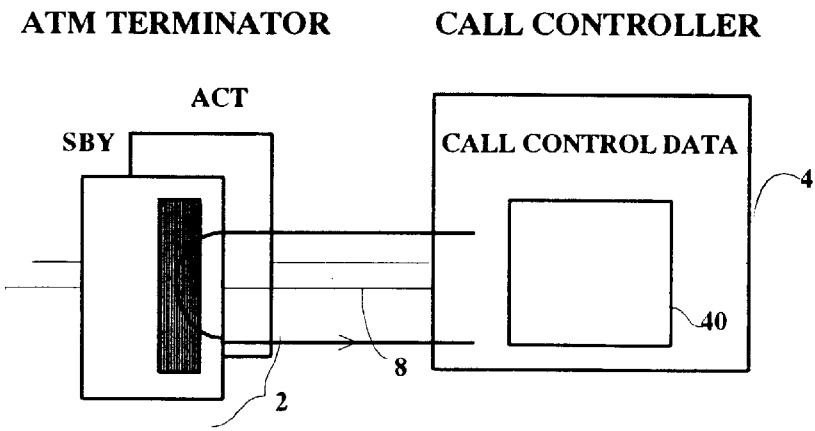

FIGS. 8A to 8C show diagrams explaining a case where a communication failure occurs between the ATM terminator 2 and the call controller 4 so that it becomes difficult to read the cell count value.

When a communication failure occurs between the ATM terminator 2 and the call controller 4, it becomes impossible to read the cell count value. Then, the ATM terminator 2 on which the cell count value is collected on restoring the communication is switched to the standby group. In here, the call control data is frozen on the call controller side and forms the billing data by reading the cell counter on the standby group from the data. Thereby, it becomes possible to relieve the billing data on encountering the communication failure.

FIG. 8A shows a normal status before the communication failure occurs. Then, the active ATM terminator 2 and the call controller 4 count the number of the cells in a real time.

On the contrary, FIG. 8B shows a disconnected status. In this status, the call is disconnected by the failure of a communication path 8, and therefore, the cell count value can not be read out. Then, the corresponding call control data is frozen until restoring the path failure.

Further, the cell counted ACT group on the path failure is switched to the SBY group. Therefore, it is possible to execute a normal service if the ACT group and construct the billing data according to the call control data frozen in the SBY group.

In here, there is a possibility to loose the billing data when an operator switches the duplicated device under relief processing of the billing data as other problem. Then, it is possible to inform the problem and warn the risk.

For example, the operator requests to switch the group of the ATM terminator 2 while relieving the billing data. When the system can confirm that the relief processing of the billing data is now executed, the system inquires the operator whether or not the group should be switched even while relieving the billing data before switching.

When the operator still requests to switch the group, the group is switched and the billing data of the switching system is initialized. When the operator stops switching the group according to the warning, the group is not switched and the relief processing of the billing data is continued.

It is possible to execute the above-described processing by the processing program stored in the processing program memory 401 of the call controller 4.

It is also possible to output the status for relief processing of the billing data according to the request of the operator. However, while executing the relief processing of the billing data, the status on relieving the billing data can be indicated. The outputted data is as follows:

i. While relieving the billing data, the following data are pooled:
    Date of starting relief processing
    The number of the cells to be relieved
    The number of the cell data completed to relieve
    The number of lost cells
  ii. When requesting the indication of the billing data while relieving the billing data, a ratio for performing the above described i or the relieving processing is calculated and outputted.

iii. When finishing to relieve the billing data, the date when the cells are finished to relieve is pooled.

iv. When requesting the indication, the above described data pooled in i and iii are outputted.

Furthermore, it is possible to inform the above-described pooled data on completing to relieve the billing data. Then, the date of the completion of the relief processing is pooled and the pooled data is edited and informed, simultaneously.

As described according to the embodiments employing the present invention, a relief system of the billing data in which the billing data can be relieved on resuming in the ATM switching system is provided. It is possible to provide a relief method of the billing data in which the billing data can be relieve don initialization in the ATM switching system composed of an exclusive device for collecting the billing data, i.e., the number of the cells, and a call controller.

The present invention may be embodied in other specific forms without departing from the spirit or essential characteristics thereof. The present embodiment is therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A relief method of billing data on an asynchronous transfer mode switching system comprising:

an asynchronous transfer mode switch;

a terminator provided on an input side of said asynchronous transfer mode switch for counting the numbers of cells sent from subscribers or other switching system; and a call controller for controlling paths on said asynchronous transfer mode switch, collecting a count value of the numbers of cells counted on said terminator, and creating billing data according to the count value of the collected cell number and call control data, wherein only the count value of the number of cells counted on said terminator is removed from the subjects to be initialized on initialization caused by a failure.

2. A relief method of billing data on an asynchronous transfer mode switching system comprising:

an asynchronous transfer mode switch;

a terminator provided on an input side of said asynchronous transfer mode switch for counting the numbers of cells sent from subscribers or other switching system;

a call controller for controlling paths on said asynchronous transfer mode switch, collecting said count value of the numbers of cells counted on said terminator, and creating billing data according to the count value of the collected numbers of the cells and call control data, wherein the numbers of cells and the call control data are frozen on initialization caused by a failure.

3. The relief method of billing data according to claim 2, wherein said terminator and call controller are duplicated, so that the numbers of cells and the call control data frozen on the failure are transferred from an active group to a standby group.

4. The relief method of billing data according to claim 2, wherein said call controller reads corresponding count value of the numbers of cells on said terminator from the control data employed on the initialization according to said call control data, and forms billing data by combining said read count value of the numbers of cells and said call control data.

5. The relief method of billing data according to claim 4, wherein double charging is prevented by masking said call control data on initialization after forming said billing data after call termination and before said call control data in said call controller and the cell count value on said terminators are initialized.

6. The relief method of billing data according to claim 4, wherein said call control data is masked on initialization that occurs before forming the billing data after call termination, and after initializing the cell count value counted in the terminator, so that double charging is prevented.

7. The relief method of billing data according to claim 2, wherein in case that collection of a count value of the numbers of cells in impossible due to communication failure between a terminator and a cell controller a terminator and a call controller belonging to an act group which have counted the numbers of the cells are switched to another terminator and another call controller belonging to a standby group, so that the call controller belonging to the standby group forms billing data.

* * * * *

UNITED STATES PATENT AND TRADEMARK OFFICE
CERTIFICATE OF CORRECTION

PATENT NO. : 5,923,740
DATED : July 13, 1999
INVENTOR(S) : Kazuya ITO, et al.

It is certified that error appears in the above-indentified patent and that said Letters Patent is hereby corrected as shown below:

Claim 7, column 8, line 38, change "in" to --is--.

Signed and Sealed this

Twenty-third Day of November, 1999

Attest:

Q. TODD DICKINSON

*Attesting Officer*    *Acting Commissioner of Patents and Trademarks*